United States Patent
Holm et al.

(10) Patent No.: US 7,982,614 B2
(45) Date of Patent: Jul. 19, 2011

(54) METHOD AND APPARATUS FOR WIRELESS ASSET TRACKING USING ASSET TAGS WITH MOTION SENSORS

(75) Inventors: Henrik Holm, Kalamazoo, MI (US); Steve D. Huseth, Plymouth, MN (US); Andrew G. Berezowski, Wallingford, CT (US)

(73) Assignee: Honeywell International Inc., Morristown, NJ (US)

( * ) Notice: Subject to any disclaimer, the term of this patent is extended or adjusted under 35 U.S.C. 154(b) by 362 days.

(21) Appl. No.: 12/193,430

(22) Filed: Aug. 18, 2008

(65) Prior Publication Data

US 2010/0039280 A1 Feb. 18, 2010

(51) Int. Cl.
*G08B 13/14* (2006.01)
(52) U.S. Cl. .................... 340/572.4; 340/691.6; 342/450
(58) Field of Classification Search ............... 340/572.1, 340/572.4, 539.13, 539.32, 825.49; 342/450, 342/458, 463–465
See application file for complete search history.

(56) References Cited

U.S. PATENT DOCUMENTS

| | | | | |
|---|---|---|---|---|
| 5,119,104 A * | 6/1992 | Heller | ............................ | 342/450 |
| 5,844,482 A * | 12/1998 | Guthrie et al. | ............. | 340/572.4 |
| 5,920,261 A * | 7/1999 | Hughes et al. | ............. | 340/568.8 |
| 5,995,046 A * | 11/1999 | Belcher et al. | ................ | 342/450 |
| 6,034,603 A | 3/2000 | Steeves | | |
| 6,353,406 B1 * | 3/2002 | Lanzl et al. | ............. | 340/825.49 |
| 6,373,389 B1 * | 4/2002 | Przygoda et al. | .......... | 340/572.4 |
| 6,396,438 B1 * | 5/2002 | Seal | ......................... | 340/825.49 |
| 6,570,487 B1 | 5/2003 | Steeves | | |
| 6,574,482 B1 * | 6/2003 | Radomsky et al. | ...... | 340/825.49 |
| 6,750,765 B1 * | 6/2004 | van Wijk | .................... | 340/539.1 |
| 6,888,459 B2 | 5/2005 | Stilp | | |
| 6,972,683 B2 * | 12/2005 | Lestienne et al. | .......... | 340/572.1 |
| 7,005,985 B1 | 2/2006 | Steeves | | |
| 7,046,147 B2 | 5/2006 | Stigall | | |
| 7,286,158 B1 | 10/2007 | Griebenow | | |
| 2004/0174264 A1 * | 9/2004 | Reisman et al. | ......... | 340/825.49 |
| 2005/0075119 A1 | 4/2005 | Sheha et al. | | |
| 2007/0008135 A1 | 1/2007 | Sajkowsky | | |
| 2007/0046464 A1 | 3/2007 | Onderko et al. | | |
| 2007/0057789 A1 | 3/2007 | Hamerly et al. | | |

(Continued)

FOREIGN PATENT DOCUMENTS

WO      WO 98/10307 A1      3/1998

OTHER PUBLICATIONS

Amer Catovic et al., "Hybrid TOA/RSS and TDOA/RSS Location Estimating Schemes for Short-Range Wireless Networks", Bechtel Telecommunication Technical Journal, Sep. 2004, vol. 2, No. 2, 8 pages.
Kaveh Pahlavan et al., "Indoor Geolocation Science and Technology", IEEE Communications Magazine, Feb. 2002, pp. 112-118.
K. W. Cheung et al., "Least Squares Algorithms for Time-of-Arrival-Based Mobile Location", IEEE Transactions on Signal Processing, vol. 52, No. 4, Apr. 2004, pp. 1121-1128.

(Continued)

*Primary Examiner* — Thomas J Mullen
(74) *Attorney, Agent, or Firm* — Munck Carter, LLP

(57) ABSTRACT

A system includes an asset tag associated with an asset, the asset tag having a motion sensor to detect a movement of the asset. The system also includes a plurality of readers, each reader receiving one or more signals from the asset tag and measuring a distance between the asset tag and the reader based on the signals. The system further includes a controller receiving a measured distance from each of the plurality of readers and determining a location of the asset based on the measured distances.

20 Claims, 3 Drawing Sheets

U.S. PATENT DOCUMENTS

| | | |
|---|---|---|
| 2007/0132577 A1 | 6/2007 | Kolavennu |
| 2007/0132586 A1* | 6/2007 | Plocher et al. ............. 340/572.1 |
| 2007/0176779 A1 | 8/2007 | Braunstein |
| 2007/0241901 A1 | 10/2007 | Cage et al. |
| 2007/0247366 A1 | 10/2007 | Smith et al. |
| 2007/0285241 A1 | 12/2007 | Griebenow et al. |
| 2007/0288249 A1 | 12/2007 | Rowe et al. |
| 2009/0051551 A1 | 2/2009 | Pham et al. |
| 2009/0221301 A1* | 9/2009 | Riley et al. ................. 455/456.5 |

OTHER PUBLICATIONS

Jose A. Costa et al., "Achieving High-Accuracy Distributed Localization in Sensor Networks", 2005 IEEE, pp. 641-644.

Muzaffer Kanaan et al., "A comparison of wireless geolocation algorithms in the indoor environment", IEEE Communications Society, 2004, pp. 177-182.

* cited by examiner

METHOD AND APPARATUS FOR WIRELESS ASSET TRACKING USING ASSET TAGS WITH MOTION SENSORS

TECHNICAL FIELD

This disclosure relates generally to asset tracking systems and more specifically to an apparatus and method for tracking assets using asset tags with motion sensors.

BACKGROUND

Asset tracking systems are used to track the locations of assets in a facility. These systems may be used as part of a process control system or as part of a security system allowing the systems to identify when assets enter predefined areas or when assets are moved to or from their designated locations.

Asset tracking systems may be implemented using an asset tag attached or fixed to an asset. The asset tag periodically sends signals or "beacons" that are received by any number of readers at fixed locations throughout the facility. The readers use the signals to measure the distance between the asset tag and the readers. The readers then send the measurements to a central location, for example, by way of a mesh network. A system at the central location then uses the measurements from the readers to calculate the location of the asset.

Although such asset tracking systems are useful in keeping track of assets, they suffer from a lack of scalability and are prone to flooding as the number of asset tags increase. Accordingly, the capacity of the system (measured in terms of the number of tags that can be tracked/second) may be lower than desired for many applications. Although the beaconing rate of the asset tag could always be reduced in order to accommodate a higher number of tags, reducing the beaconing rate results in an increased lag time in providing a reliable location estimate because the most current information is not available should an asset start moving.

SUMMARY

This disclosure provides a system and method for tracking assets.

In a first embodiment, a system includes an asset tag associated with an asset, the asset tag having a motion sensor to detect a movement of the asset. The system also includes a plurality of readers, each reader receiving one or more signals from the asset tag and measuring a distance between the asset tag and the reader based on the signals. The system further includes a controller receiving a measured distance from each of the plurality of readers and determining a location of the asset based on the measured distances.

In particular embodiments, the asset tag is attached to the asset.

In other particular embodiments, the asset tag transmits the signals at a first rate when the asset is stationary.

In other particular embodiments, the asset tag transmits the signals at a second rate when the asset is in motion.

In yet other particular embodiments, the first rate is different from the second rate.

In still other particular embodiments, the second rate is faster than the first rate.

In a second embodiment, a method includes detecting a movement of an asset using an asset tag having a motion sensor. The method also includes transmitting one or more signals at a second rate in response to detecting a movement of the asset.

In a third embodiment, an apparatus includes a motion sensor detecting a movement of an asset. The apparatus also includes a controller transmitting one or more signals at a second rate in response to the motion sensor detecting a movement of the asset.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
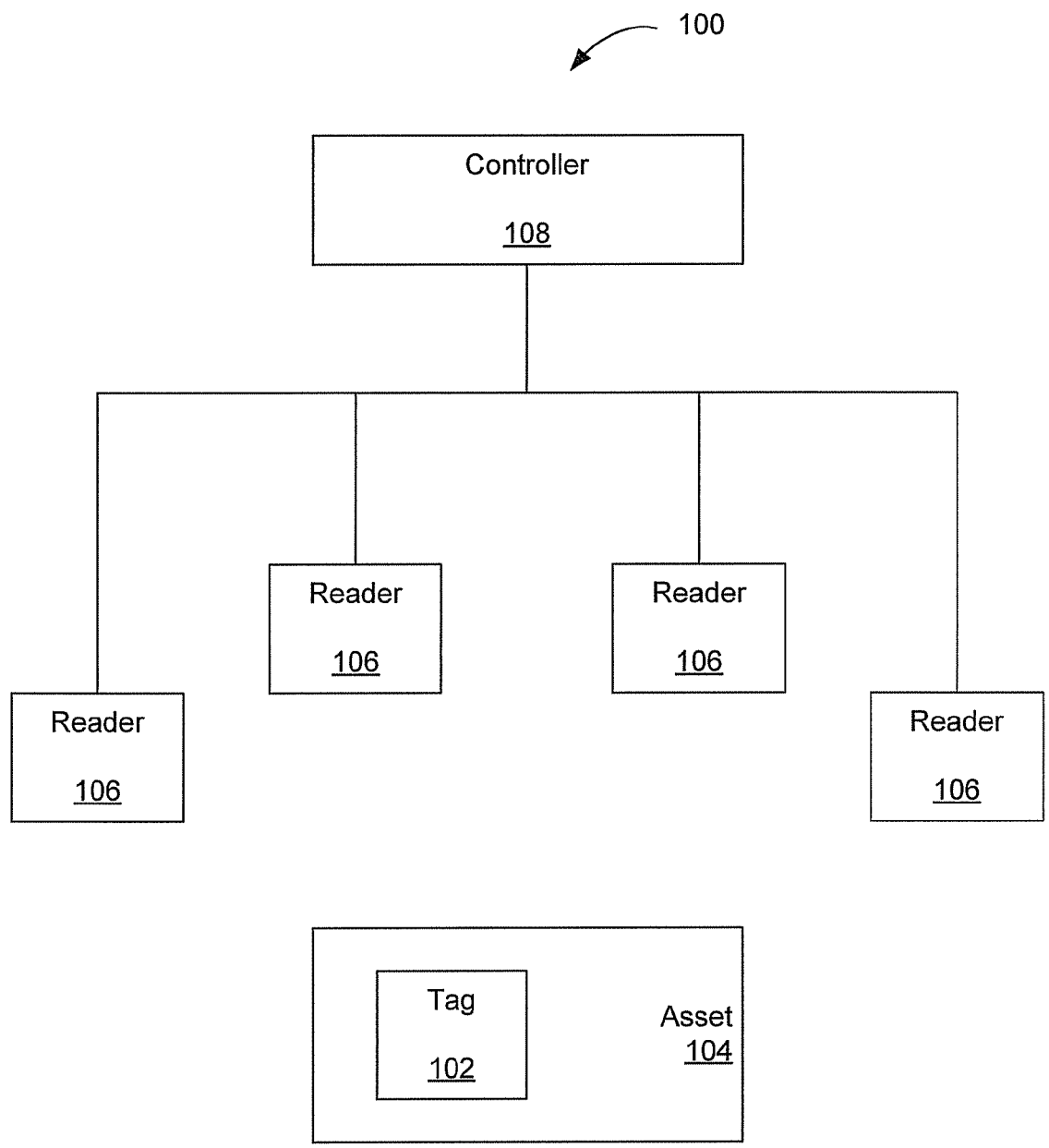
FIG. 1 illustrates an example of an asset tracking system according to an embodiment of this disclosure.
Figure 2:
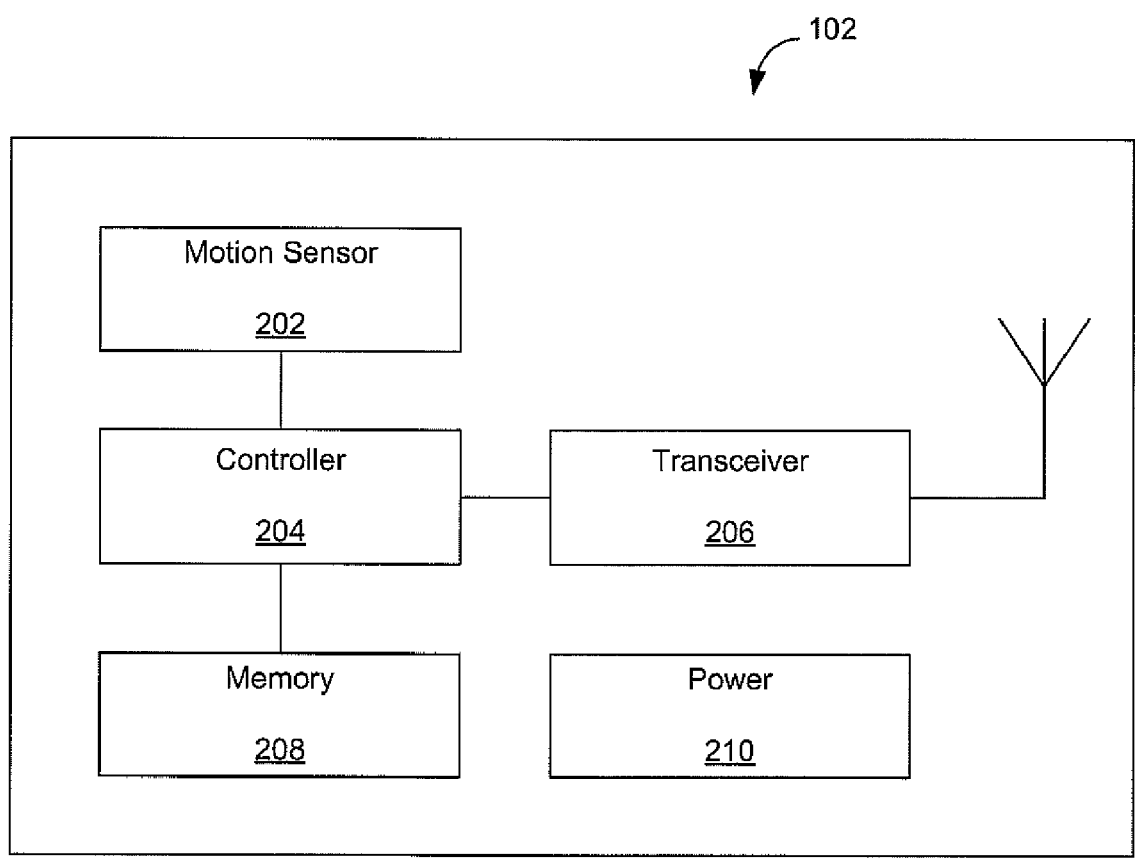
FIG. 2 illustrates an example of an asset tag according to an embodiment of this disclosure.
Figure 3:
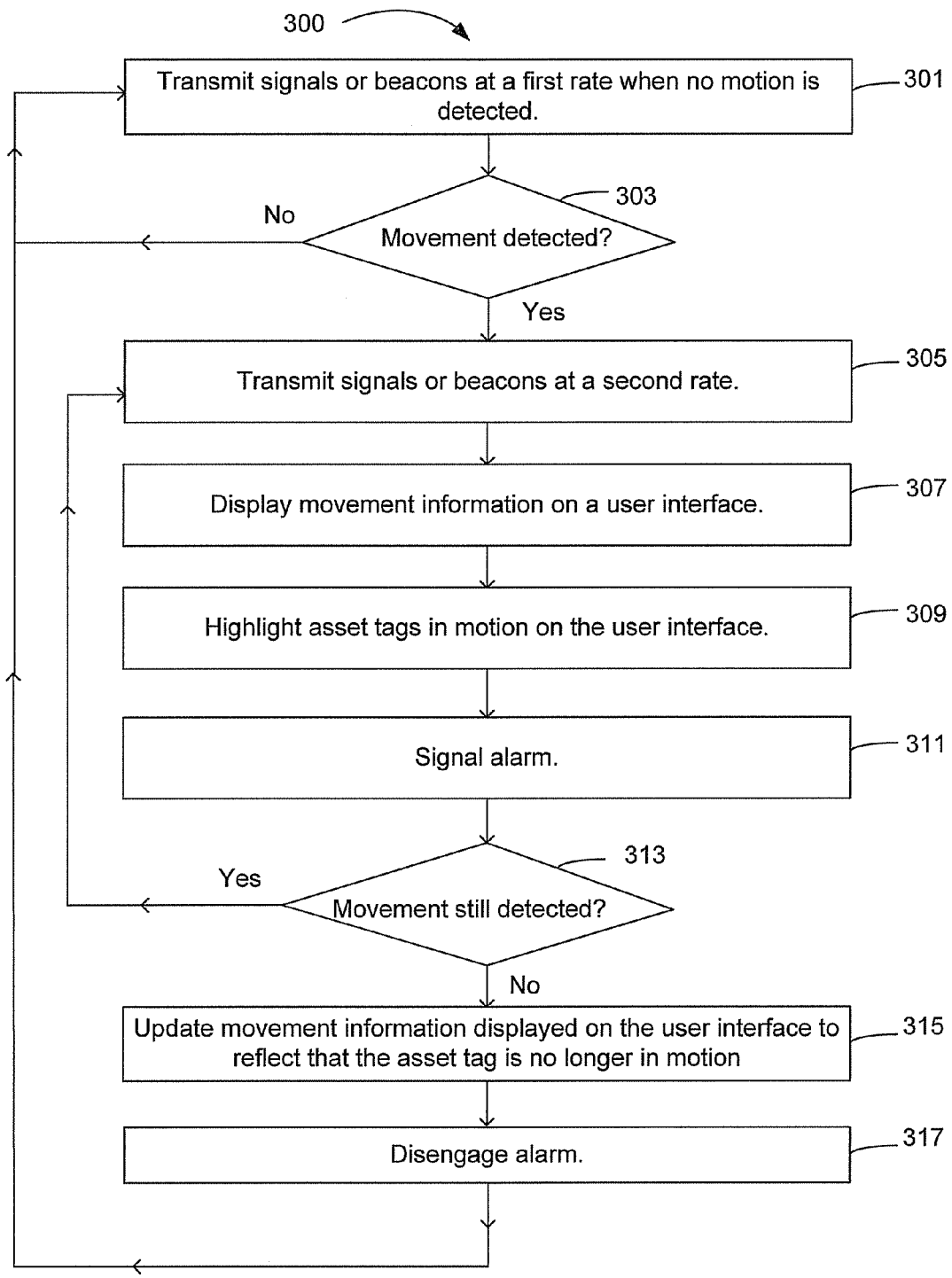
FIG. 3 is a flow chart illustrating a method of tracking an asset according to an embodiment of this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example system 100 according to this disclosure. The embodiment of the system 100 shown in FIG. 1 is for illustration only. Other embodiments of asset tracking system 100 could be used without departing from the scope of this disclosure.

As shown in FIG. 1, an asset tag 102 is attached or fixed to an asset 104. Upon detecting a movement of the asset 104, the asset tag 102 emits signals or "beacons" that are detected by any number of readers 106 placed at fixed locations throughout the facility. The readers 106 then use the signals to measure the distance between the asset tag 102 and the respective reader 106. The readers 106 then send the measurements to a controller 108. The controller 108 uses the measurements from readers 106 to calculate the location of asset 104. The location of asset 104 may be calculated, for example, by triangulation from the readers 106. Of course, the location of asset 104 may be calculated by any method or system known to one of ordinary skill in the art.

Because the asset tag 102 will only beacon when it detects a movement of the asset 104, a significant increase in the number of asset tags tracked by the asset tracking system 100 is realized. For example, depending on how often the assets are moved, whether the assets are moved independently or in tandem, and the duration of the movement, the capacity of asset tracking system 100 can be increased by several orders of magnitude in some embodiments.

Although FIG. 1 shows asset tracking system 100 with one asset tag 102, one controller 108, and four readers 106, one of ordinary skill in the art would recognize that any number of asset tags 102, controllers 108, and readers 106 could be implemented in asset tracking system 100.

FIG. 2 illustrates an example of an asset tag according to an embodiment of this disclosure. As shown in FIG. 2, the asset tag 102 comprises a motion sensor 202, which signals whether the asset tag 102 is stationary or in motion. The motion sensor 202 is coupled to a controller 204. Upon detecting a movement of the asset by the motion sensor 202, the controller 204 transmits signals or beacons using a transceiver 206, which is coupled to an antenna. As described earlier, the signals or beacons transmitted by controller 204 are received by any number of readers 106 and are used to calculate the location of the asset.

The controller 204 is also coupled to a memory 208. The memory 208 stores applications and data for implementing various functions of the controller 204. The memory 208 also stores data generated by the operation of the controller 204.

A power supply 210 provides electrical power as needed to the components of the asset tag 102 via electrical connections that are not shown in FIG. 2. It will be understood that certain components shown as distinct entities in FIG. 2 may be combined into integrated components. For example, the memory 208 and the controller 204 could be constructed as a single processing element.

In one embodiment, the asset tag 102 transmits an occasional signal or beacon even when no motion is detected by the motion sensor 202. This occasional signal or beacon serves to indicate that the asset tag 102 is functioning properly and is still within range of the readers 106. In such an embodiment, the asset tag 102 also may start transmitting signals or beacons at a significantly higher rate upon the detection of movement and continue to do so until the movement stops. This would allow controller 108 to be instantly informed during movement with up-to-date measurements.

Even for a stationary asset tag, the distance measurements are plagued by errors due to shadowing, multipath distortion, and so forth. Accordingly, it is advantageous to average several measurements in order to arrive at a location estimate with higher confidence even for a stationary asset tag. Moreover, if a signal or beacon contains information on whether the asset tag is stationary, a localization algorithm may utilize this information and treat it accordingly.

In some embodiments, the movement information would be displayed on a user interface, for example, at the controller 108. The user interface would also highlight the asset tags are that currently in motion. In other embodiments, an alarm may be signaled, for example, at the controller 108 upon a movement of any asset tag.

FIG. 3 is a flow chart illustrating a method 300 of tracking an asset according to an embodiment of this disclosure. In step 301, an asset tag transmits signals or beacons at a first rate when no motion is detected. The signals or beacons transmitted at step 301 may contain information indicating that the asset tag is stationary or the stationary nature of the asset tag may be inferred simply from the rate at which the signals or beacons are transmitted. If a movement of the asset tag is detected in step 303, the asset tag transmits signals or beacons at a second rate, which is higher than the first rate, at step 305. The signals or beacons transmitted at step 305 may contain information indicating that the asset tag is moving or the movement of the asset tag may be inferred simply from the rate at which the signals or beacons are transmitted.

Movement information is displayed on a user interface at step 307, and the asset tags that are currently in motion are highlighted in step 309. An alarm is signaled in step 311. If movement of the asset tag is still detected in step 313, the method repeats steps 305 to 311. If movement of the asset tag is no longer detected in step 313, the movement information displayed on the user interface is updated to reflect that the asset tag is no longer in motion in step 315, and the alarm is disengaged in step 317. The method then returns to step 301 where the asset tag transmits signals or beacons at the first rate until a movement of the asset tag is detected again.

Although FIG. 3 illustrates an example of a method for tracking an asset, various changes may be made to FIG. 3. For example, while shown as a series of steps, various steps in FIG. 3 could overlap, occur in parallel, occur in a different order, or occur multiple times. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
   an asset tag associated with an asset, the asset tag having a motion sensor configured to detect a movement of the asset;
   a plurality of readers, each reader configured to receive one or more signals from the asset tag and measure a distance between the asset tag and the reader based on the one or more signals;
   a controller configured to receive a measured distance from each of the plurality of readers and determine a location of the asset based on the measured distances; and
   a user interface configured to highlight information associated with the asset when the asset is in motion.

2. The system of claim 1, wherein the asset tag is attached to the asset.

3. The system of claim 1, wherein the asset tag is configured to transmit the one or more signals at a first rate when the asset is stationary.

4. The system of claim 3, wherein the asset tag is configured to transmit the one or more signals at a second rate when the asset is in motion.

5. The system of claim 4, wherein the first rate is different from the second rate.

6. The system of claim 4, wherein the second rate is faster than the first rate.

7. A method, comprising:
   detecting a movement of an asset using an asset tag having a motion sensor;
   transmitting one or more signals at a first rate in response to detecting a movement of the asset; and
   displaying on a user interface highlighted information associated with the asset when the asset is in motion.

8. The method of claim 7, further comprising:
   measuring a distance from the asset tag to each of a plurality of readers using the one or more signals; and
   determining a location of the asset using the measured distances.

9. The method of claim 8, further comprising:
   averaging at least some of the measured distances to determine the location of the asset.

10. The method of claim 7, further comprising:
    transmitting the one or more signals at a second rate in an absence of a detected movement of the asset.

11. The method of claim 10, wherein the first rate is different from the second rate.

12. The method of claim 10, wherein the first rate is faster than the second rate.

13. The method of claim 7, further comprising:
    signaling an alarm in response to detecting the movement of the asset.

14. A system, comprising:
    a plurality of readers, each reader configured to receive one or more signals from an asset tag associated with an asset and measure a distance between the asset tag and the reader based on the one or more signals;
    a controller configured to receive a measured distance from each of the plurality of readers and determine a location of the asset based on the measured distances; and
    a user interface configured to highlight information associated with the asset when the asset is in motion.

15. The system of claim 14, wherein each reader is configured to receive the one or more signals at a first rate when the asset is stationary and receive the one or more signals at a second rate when the asset is in motion.

16. The system of claim 15, wherein the first rate is different from the second rate.

17. The system of claim 15, wherein the second rate is faster than the first rate.

18. The system of claim 15, wherein the controller is configured to average at least some of the measured distances to determine the location of the asset.

19. The system of claim 15, wherein the one or more signals comprise information indicating whether the asset is stationary.

20. The system of claim 19, wherein the measured distances of the asset from each of the plurality of readers are used to determine a location of the asset.

* * * * *